Patented July 26, 1949

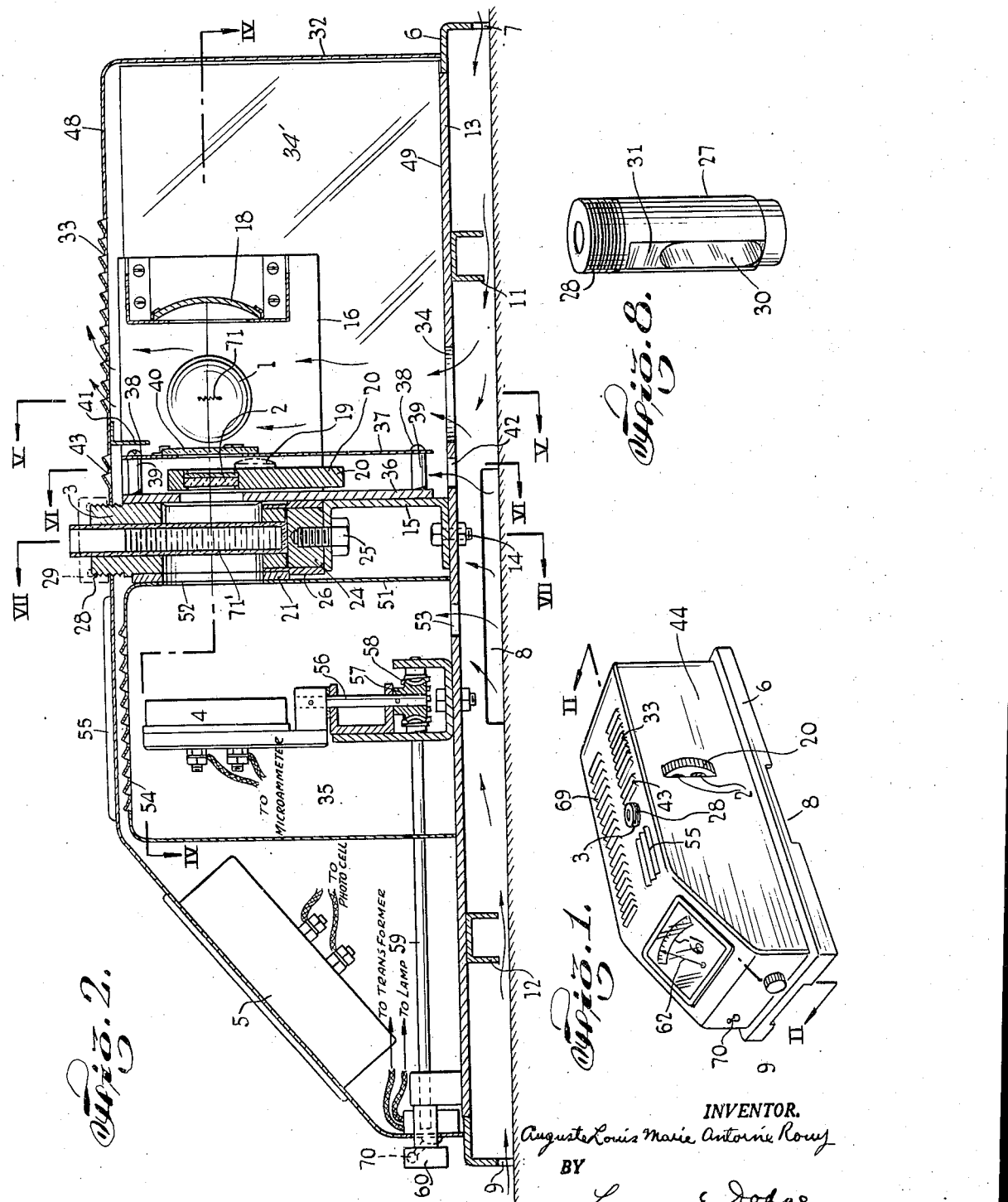

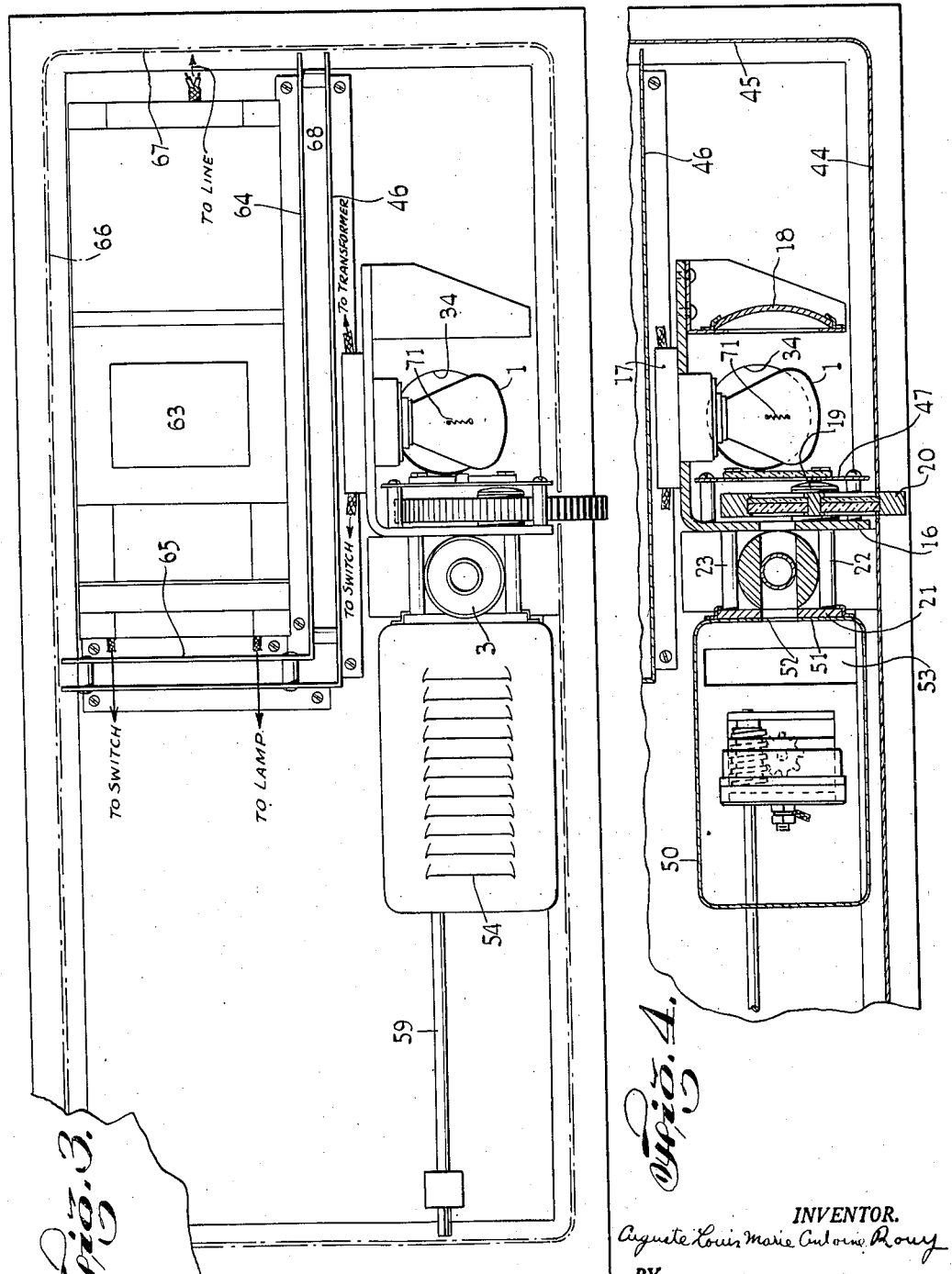

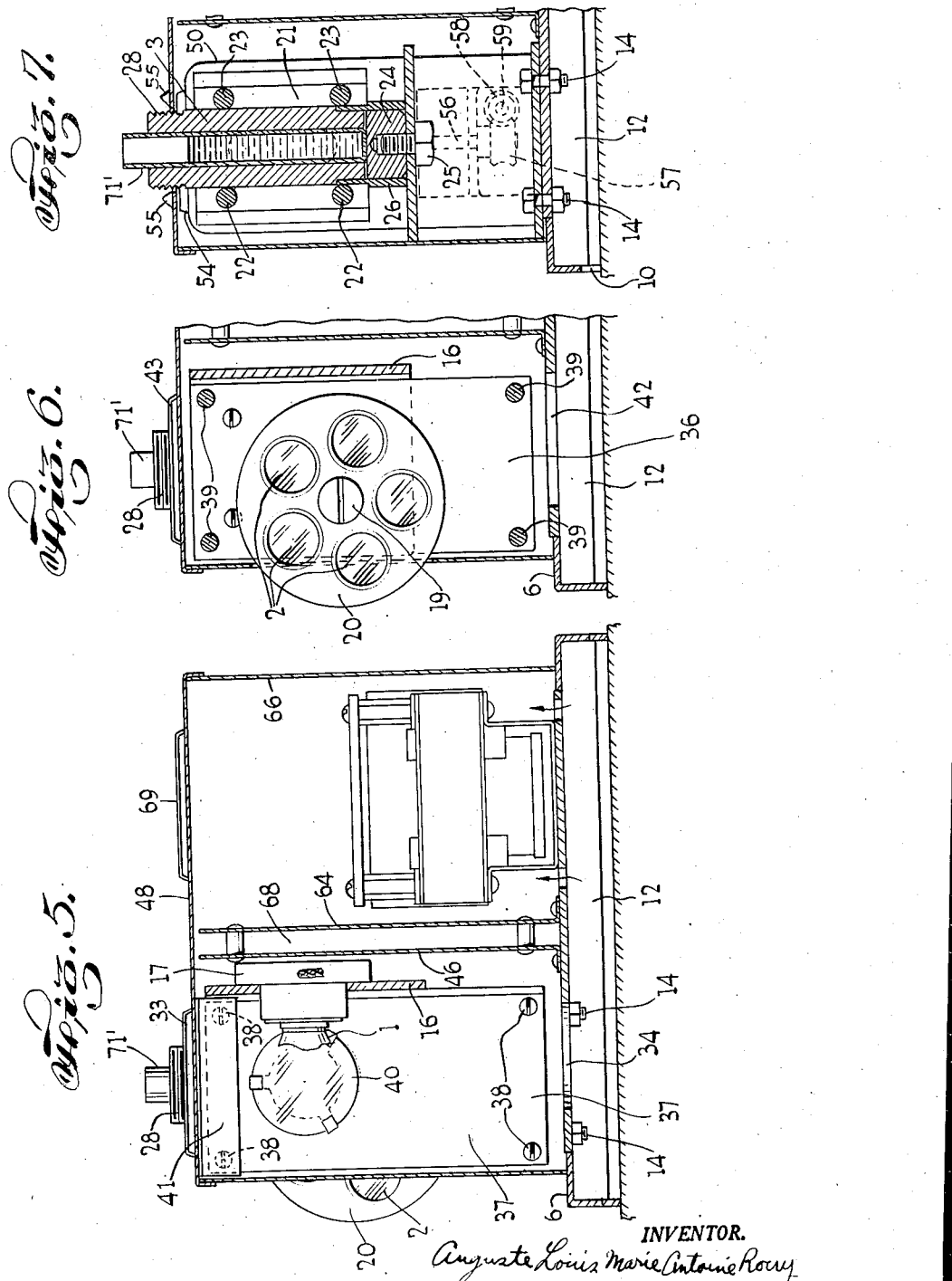

2,477,209

UNITED STATES PATENT OFFICE 2,477,209
COLORIMETER

Auguste Louis Marie Antoine Rouy, New York, N. Y.

Application June 8, 1946, Serial No. 675,473

4 Claims. (Cl. 250—41.5)

This invention relates to photo-electric colorimetry.

A principal object of this invention is the construction of a colorimeter such that a minimum of disturbance will be caused by heat generated by the source of illumination or the means used to energize the source of illumination.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views therein, wherein like characters of reference designate like parts throughout the several views, and in which:

Figure 1 is a perspective view of a device embodying my invention; Fig. 2 is a longitudinal sectional view on the plane indicated by the line II—II of Fig. 1 viewed in the direction of the arrows at the ends of the line; Fig. 3 is a top plane view of the device of Fig. 1 with the outside cover removed; Fig. 4 is a cross sectional view on the plane indicated by the line IV—IV of Fig. 2 viewed in the direction of the arrows at the ends of the line; Fig. 5 is a cross sectional view on the plane indicated by the V—V of Fig. 2 viewed in the direction of the arrows at the ends of the line; Fig. 6 is a cross sectional view on the plane indicated by the line VI—VI of Fig. 2 viewed in the direction of the arrows at the ends of the line; Fig. 7 is a cross sectional view on the plane indicated by the line VII—VII of Fig. 2 viewed in the direction of the arrows at the ends of the line; Fig. 8 is a perspective view of a light absorbing medium container holder.

As best seen in Fig. 2, my colorimeter includes, generally speaking, a source of light 1, a filter 2, a light absorbing medium container holder 3, a photo-cell 4 and a microammeter 5. Concentration of a colored solute in a solvent in a container holder 3 is ascertained by reading the microammeter 5. The microammeter reading by the use of an accompanying table is transformed into a concentration value. In case one colored solute only is to be determined by the colorimeter, the microammeter may be graduated directly into concentrations.

Tests with a known form of colorimeter of the same general arrangement have shown that after one and one-half hours of operation with the room temperature about 20° C. the temperature of the photo-cell increased to about 41° C. This is highly detrimental to precise determination, because the photo-cell is very sensitive to temperature changes. Furthermore the limiting top temperature for a photo-cell for proper operation is about 50° C.

My construction is such that although a large quantity of heat is generated by the light source 1, nevertheless, the increase in temperature of the photo-cell is very slight.

The base of the colorimeter includes a marginal angle iron 6, which extends entirely around and defines the outer limits of the base. This angle iron has cut-away portions in both ends and both sides, as 7, 8 and 9, best shown in Fig. 2 and 10, best shown in Fig. 7. Cross stiffeners or load bearers 11 and 12, preferably in the form of channel irons are used. These are of such vertical height that they do not extend downwardly sufficiently to contact a table or other support for the colorimeter so that there is opportunity for a very free circulation of air under the supporting platform 13.

The platform 13 supports and has attached thereto, as by bolts 14, a tranverse channel support 15. Attached to and supported by the channel support 15 is the angle lamp support 16, which carries the base 17 for lamp 1. Also carried by the angle support 16 is the reflecting mirror 18, the central pivot 19 of a filter carrier 20, and an aperture plate 21, which is attached to angle support 16 by reach rods, as 22 and 23.

In addition to supporting angle support 16, channel support 15 supports an absorbing medium container holder 3. This holder 3 includes a circular base 24 rigidly attached to channel support 15 by a bolt 25; a sleeve 26 surrounding and tightly squeezing circular base 24 and extending thereabove; a hollow test tube receiver 27, best shown in Fig. 8, which is reduced at the lower end to enter sleeve 26, is provided at the top with screw threads 28 for receiving a screw threaded cap 29, is pierced transversely by a slot 30 to allow light rays to pass therethrough, and is provided with a flat surface 31 which serves to position it by contact with aperture plate 21.

When the lamp 1 has current flowing therethrough a very considerable heat is generated. To prevent this heat, as far as practically possible, from reaching photo-cell 4, I attempt to pass it all out at the top of the lamp compartment. To this end, I enclose all of the mechanism of the colorimeter in a casing 32. Just above the position of the lamp 1, I form openings or louvres 33 in the top of the casing 32 so that the heated air caused by the heat from the lamp 1 will cause a current of air to flow through the cutaway portions of the angle iron 6, at 7, 8, 9 and 10, and through an orifice 34, in the supporting platform 13, and thence up and around the lamp 1 through the direct light-excluding openings or louvres 33. These openings exclude light from directly above and at the left, as viewed in Fig. 2.

In addition to causing a flow of cooling air through the portion of the enclosing cover 32 which forms the lamp compartment, I also quite substantially shut off the lamp compartment 34' from the photo-cell compartment 35. This is done substantially by the leg 36 of the angle support 16 as best shown in Fig. 4. In addition I place a heat-shielding plate 37 between the lamp 1 and the filter carrier 20, best shown in Fig. 2. This shielding-plate 37 is carried on angle support 16 by screws as 38 and spacers as 39. This shielding plate 37 shields the filter carrier and any solution being analyzed which is in the container 27. In order to allow light to pass from the lamp 1 to and through the filter, as 2, I place a transparent window 40 over an orifice 41 in the shielding plate 37. This transparent member 40 allows light to pass but assists greatly in cutting off heat rays. It may be a heat filter.

In addition to the above means for protecting photo-cell 4 from heat from lamp 1, I place a baffle 41 extending down from the top of the case 32 and extending transversely thereof so that heat rising from lamp 1 is deflected toward the louvres 33.

In addition to the above, I also provide an orifice 42 through which air from openings, as 7, may pass upwardly and around the filter carrier 20 and out through openings or louvres 43 in the top of the case 42. These louvres exclude light directly above or at the left thereof as viewed in Fig. 2.

In order that the heat generated by the lamp 1 will not pass substantially into the chamber 25, I form all of the broad surrounding surfaces in the chamber 34' of highly polished metal, that is, as best shown in Fig. 4, the surfaces 44, 45, 46, 47 and 48 and preferably surface 49. I prefer to have all of these surfaces formed of metal having a low emissivity factor.

A metal suitable for such purpose would be highly polished aluminum, copper or silver, preferably copper or silver. Using these metals and having all surfaces carefully polished substantially all heat emitted by the lamp 1 will be reflected from the surface within the chamber 34', thereby heating the air within that chamber and acting to largely increase the convection currents of air through that chamber, thereby producing a much desired and substantial cooling. At the same time the metal surrounding the chamber 34' will not become so much heated, due to their polished nature, and will, therefore, not conduct as much heat to the metals of the chamber 35 and the surrounding portion of the casing 32.

In order to further shield the photo-electric cell 4, I surround it completely by a supplementary casing 50, best shown in Fig. 4. This casing has a wall 51 on the side toward the lamp 1. This wall has a light opening 52 therethrough to allow the light rays to reach the photo-cell 4. In the platform 13, I form an orifice 54 so that air may enter from below the platform 13 and pass up and around the photo-cell 4 and out through the louvres 53 in the supplementary casing 50 and then through the louvres 55 in the outer casing 32. This casing may also be painted non-reflecting black on the inside.

I arrange the filament 71 of the lamp 1 parallel to the axis of the test tube 71'. This assists in the dissipation of heat from the lamp and the upward flow of convection currents around the lamp.

I position the photo-cell 4 on a stub shaft 56 which has a worm wheel 57 on one portion thereof cooperating with a worm 58 connected to a rod 59 having a thumb piece 60 on it projecting outwardly from the casing 32.

My microammeter 5 is preferably positioned largely within the casing but with the graduated dial 61 on the outside of the casing so as to expose the movable hand 62.

The constant voltage transformer which I use to activate the lamp 1 is designated generally at 63 and rests upon the platform 13 and is surrounded by polished surfaces identical with those of the lamp chamber 34, that is polished surfaces at 64, 65, 66 and 67. I also arrange the polished surfaces 46 and 64 in the form of a hollow wall so that there is a space 68 through which air may pass upwardly between the walls and out through the louvres 69 in the casing 32. By this means I prevent any heat from the constant current transformer 63 from reaching the photo-cell 4 and any solution contained in the container 27.

In practice the solution to be analyzed is placed in a container or test tube 71' and then the lamp 1 is energized from the constant voltage transformer 63 by means of the button switch 70 and with the proper one of the filters, as 2, in the filter holder 20 in position in the path of the light beam, the photo-electric cell 4 has a difference of potential generated therein which affects the microammeter 5 so as to give a particular reading. This reading, as is usual with colorimeters of this type is transformed into a concentration of the solute in the solvent in the test tube 6.

Although I have particularly described one particular physical embodiment of the idea of means underlying my invention, nevertheless I desire to have it understood that the form selected is merely illustrative and does not exhaust the possible physical embodiments of the idea of means underlying my invention.

What I claim as new and desire to secure by Letters Patent is:

1. In a colorimeter of the type including an electric lamp and a photo-electric cell, the combination of a transformer furnishing energy to the electric lamp and an outer casing covering the transformer, lamp and photo-electric cell, said casing formed with louvres in the top wall thereof and orifices in the base thereof, a partition formed of two spaced walls forming a chamber for the transformer separating it from the lamp and photo-electric cell, said walls where exposed to heat formed highly polished whereby heat will not be conducted to the photo electric cell and convection currents of air may circulate in the transformer chamber.

2. In a colorimeter of the type including an electric lamp and a photo-electric cell, the combination of a constant current transformer furnishing energy to the electric lamp and an outer casing covering the transformer, lamp and photo-electric cell, said casing formed with louvres in the top wall thereof and orifices in the base thereof, a partition formed of two spaced walls forming a chamber for the transformer separating it from the lamp and photo-electric cell, said walls, where exposed to heat, formed highly polished whereby heat will not be conducted to the photo-electric cell and convection currents of air may circulate in the transformer chamber.

3. In a colorimeter of the type including an electric lamp and a photo-electric cell, the combination of a transformer furnishing energy to the electric lamp and an outer casing covering the transformer lamp and photo-electric cell, said casing formed with louvres in the top wall thereof and orifices in the base thereof, a partition formed of two spaced walls forming a chamber for the transformer separating it from the lamp and photo-electric cell, said walls, where exposed to heat, formed highly polished whereby heat will not be conducted to the photo-electric cell and convection currents of air may circulate in the transformer chamber, means forming partitions forming a chamber for the lamp, the surfaces facing the lamp being highly polished, whereby heat generated in the lamp chamber is dissipated by convection currents of air therein.

4. In a colorimeter of the type including an electric lamp and a photo-electric cell, the combination of a transformer furnishing energy to the electric lamp and an outer casing covering the transformer, lamp and photo-electric cell, said casing formed with louvres in the top wall thereof and orifices in the base thereof, a partition formed of two spaced walls forming a chamber for the transformer separating it from the lamp and photo-electric cell, said walls, where exposed to heat, formed highly polished whereby heat will not be conducted to the photo-electric cell and convection currents of air may circulate in the transformer chamber, means forming partitions forming a chamber for the lamp, the surfaces facing the lamp being highly polished, whereby heat generated in the lamp chamber is dissipated by convection currents of air therein, and a supplementary chamber formed with a light-receiving orifice and orifices in the bottom walls thereof within the outer casing and louvres in the top wall thereof surrounding the photo-cell whereby convection currents of air may be formed in the photo-cell chamber.

AUGUSTE LOUIS MARIE ANTOINE ROUY.

REFERENCES CITED

The following references are of record in the file of this patent:

UNITED STATES PATENTS

| Number | Name | Date |
|---|---|---|
| 1,945,652 | Martin | Feb. 6, 1934 |
| 1,978,589 | McFarlane | Oct. 30, 1934 |
| 2,022,327 | Sheldon | Nov. 26, 1935 |
| 2,073,223 | Rose | Mar. 9, 1937 |
| 2,099,868 | Sing et al. | Nov. 23, 1937 |
| 2,198,465 | Stokes, 2nd | Apr. 23, 1940 |
| 2,232,169 | Diller | Feb. 18, 1941 |
| 2,267,319 | Benning | Dec. 23, 1941 |